United States Patent [19]

DeYoung et al.

[11] Patent Number: 4,739,339

[45] Date of Patent: Apr. 19, 1988

[54] CARTRIDGE AND METHOD OF USING A CARTRIDGE FOR PHASE CHANGE INK IN AN INK JET APPARATUS

[75] Inventors: Thomas W. DeYoung, Stormville; Arthur Mikalsen, Carmel, both of N.Y.; Aldo Scudo, Ridgefield, Conn.

[73] Assignee: Dataproducts Corporation, Woodland Hills, Calif.

[21] Appl. No.: 829,572

[22] Filed: Feb. 14, 1986

[51] Int. Cl.[4] .............................................. G01D 15/16

[52] U.S. Cl. ................................ 346/1.1; 346/140 R; 400/126

[58] Field of Search ............ 346/140 PD, 76 PH, 1.1; 400/120, 126

[56] References Cited

U.S. PATENT DOCUMENTS

| | | | |
|---|---|---|---|
| 4,530,611 | 7/1985 | Borcenk | 400/126 |
| 4,593,292 | 6/1986 | Lewis | 346/140 PD |

*Primary Examiner*—E. A. Goldberg
*Assistant Examiner*—Mark Reinhart

[57] ABSTRACT

A cartridge for hot melt or phase change ink is tubular, having a cover at one end and an opening at the other end. Upon engagement and cooperation between the cartridge and a reservoir, solid ink is dropped under the influence of gravity through the opening in the cartridge. Solid ink is retained in the cartridge until such cooperation, which includes keying the cartridge to the reservoir and forming a seal of the inlet to the reservoir between the cartridge and the reservoir.

33 Claims, 4 Drawing Sheets

CARTRIDGE AND METHOD OF USING A CARTRIDGE FOR PHASE CHANGE INK IN AN INK JET APPARATUS

BACKGROUND OF THE INVENTION

This invention relates to an ink jet wherein the ink employed within the jet is of the phase change type which may be referred to as hot melt ink.

A phase change or hot melt ink of type utilized in an ink jet is characteristically solid at room temperature. When heated, the ink will melt to a consistency so as to be jettable. A hot melt ink jet apparatus and method of operation are disclosed in co-pending application Ser. No. 610,627, filed May 16, 1984. The hot melt ink may be jetted from a variety of apparatus, including those disclosed in the aforesaid co-pending application.

A hot melt ink which is solid at room temperature may be carried by a cartridge. A hot melt cartridge carrying a single block of hot melt ink is disclosed in co-pending application Ser. No. 660,656, filed Oct. 15, 1984. In such a cartridge, the ink is melted while in the cartridge so as to supply the ink jet apparatus. Co-pending application Ser. No. 660,657, filed Oct. 15, 1984, assigned to the assignee of this invention, discloses a cartridge comprising a plurality of blocks which are advanced while in the cartridge to a position where they are released into a hopper or reservoir of the ink jet apparatus in solid state form.

SUMMARY OF THE INVENTION

It is an object of this invention to provide a cartridge for release of hot melt ink upon cooperation with the ink jet apparatus and/or the ink reservoir.

It is also an object of this invention to provide a cartridge for holt melt ink which will serve as a container for shipping and handling of the ink.

It is also an object of this invention to provide a cartridge for hot melt ink which will minimize contamination of the ink during handling and shipping.

It is a further object of this invention to provide a cartridge for hot melt ink which will contain the ink even if the container is dropped.

It is a further object of this invention to provide a cartridge which is disposable.

It is also an object of this invention to provide a cartridge which may provide a seal to the reservoir of the ink jet apparatus so as to permit priming and repriming.

It is a still further object of this invention to provide a cartridge which covers the reservoir of an ink jet apparatus so as to prevent dust and contamination from entering the reservoir.

It is yet another object of this invention to provide a cartridge which is insulated from a heated reservoir so as to permit removal of the cartridge without harzard to (i.e., burning) the operator.

In accordance with these and other objects of the invention, an ink jet apparatus comprises at least one ink jet, including a chamber and a droplet ejecting orifice and a receiving means for receiving hot melt ink in solid form. The cartridge comprises means for retaining the hot melt ink in solid form and is adapted to engage the receiving means for releasing the ink upon engagement and cooperation with the receiving means.

In accordance with one aspect of the invention, the ink is released after relative movement between the receiving means and the cartridge. In the preferred embodiment of the invention, the ink is released upon rotation of the cartridge. Keying means are provided between the cartridge and the receiving means so as to permit a keyed engagement prior to relative movement or rotation, whereupon the ink is released.

In the preferred embodiment of the invention, the cartridge includes an opening through which the solid ink falls under the influence of gravity. The cartridge further includes means interfering with the falling of the solid ink prior to engagement and cooperation between the cartridge and the receiving means. In one embodiment of the invention, the cartridge includes gripping means which are retracted upon rotation of the cartridge relative to the receiving means. In another embodiment of the invention, the interfering means supports the ink at one end and the support is retracted upon engagement with the receiving means.

In the preferred embodiment of the invention, the cartridge comprises a tubular member, including a cover at one end with an opening at the other end. Sealing means are located at the end adjacent the cover so as to seal the receiving means and associated reservoir of the ink jet apparatus to permit priming and minimize contamination of the ink.

In accordance with another important aspect of the invention, the solid ink comprises a pellet which substantially fills the receiving means.

DETAILED DESCRIPTION OF THE PREFERRED EMBODIMENTS

Figure 1:
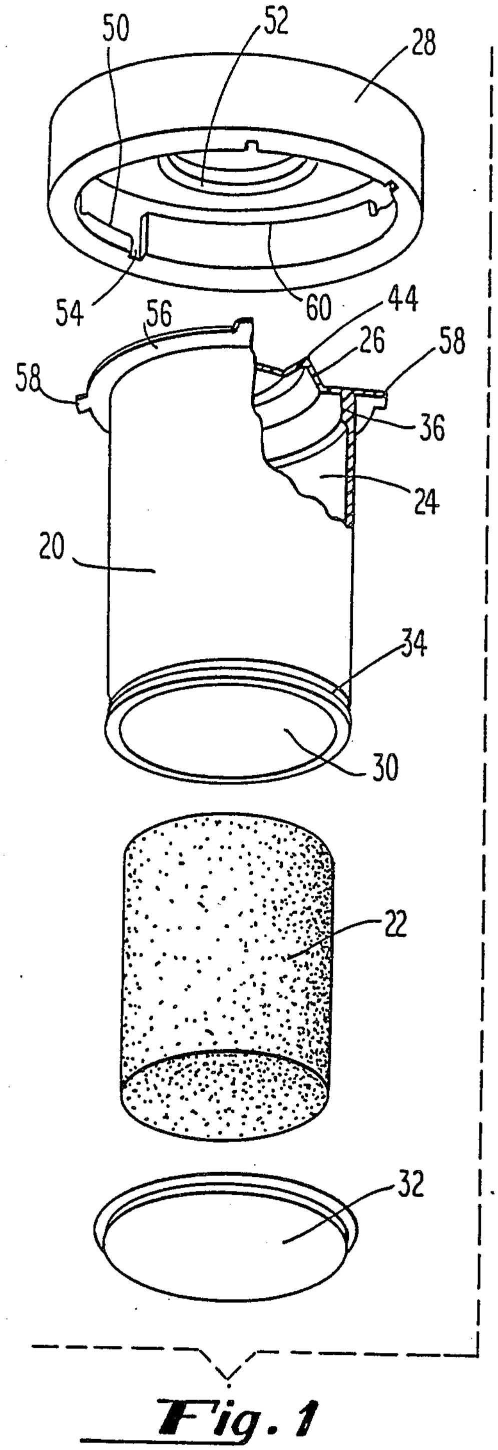
FIG. 1 is an exploded view of an ink cartridge of one embodiment of the invention.

Referring to FIG. 1, an ink cartrdige for hot melt ink for use in an ink jet apparatus is shown, comprising a tubular member 20 which is adapted to receive a solid cylindrical piece of ink 22 within a cylindrical cavity 24. The tubular member 20 is integrally formed with a top portion 26 which is capped by a cover 28 at one end of the cartridge. The other end of the cartridge includes an opening 30 through which the solid ink 22 may fall in the absence of a cover 32 which is adapted to snap into place at the opening 30. The snapping in of the cover 32 is achieved by means of a groove 34 in the tubular member 20 which cooperates with the cap 32.

Figure 2:
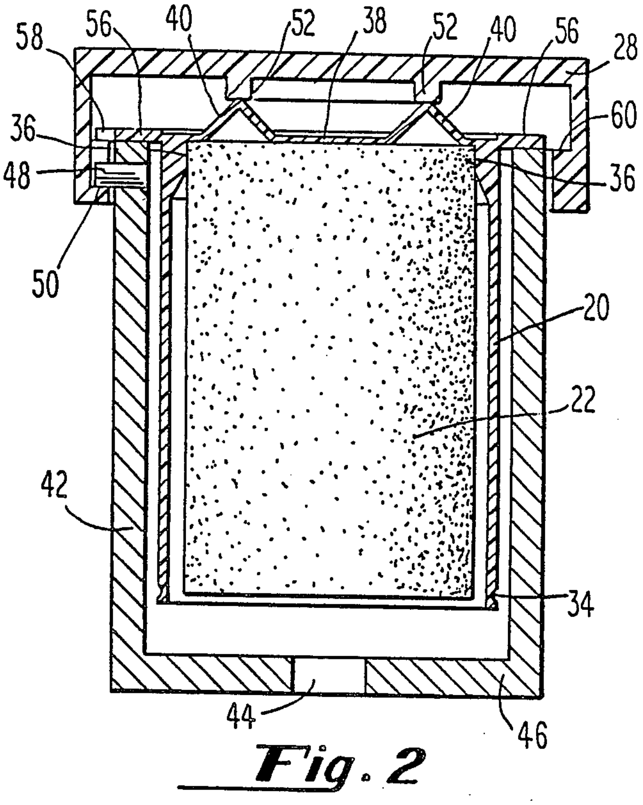
FIG. 2 is a sectional view of the cartridge of FIG. 1 in a reservoir prior to release of the ink.
Figure 3:
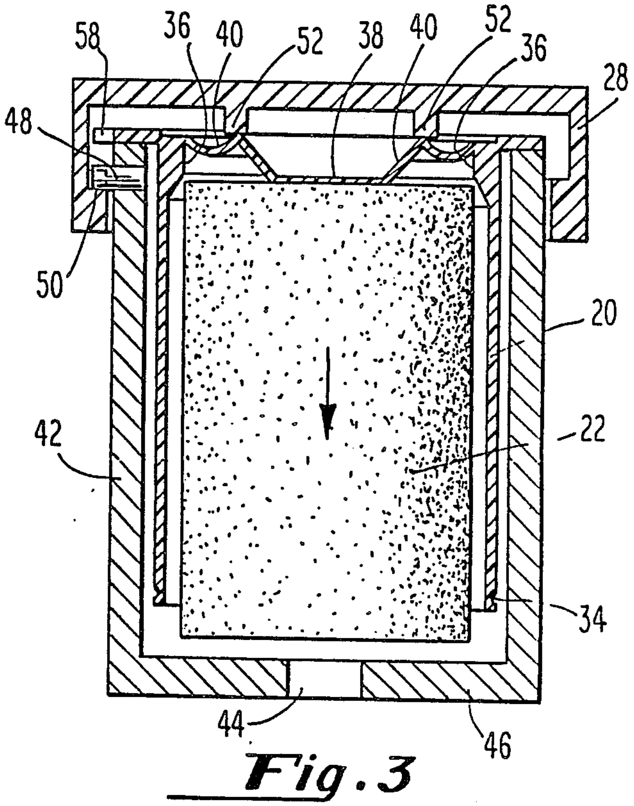
FIG. 3 is a sectional view of the cartridge of FIG. 1 in a reservoir after release of the ink.

In accordance with this invention, the release of the ink 22 from the tubular member 20 is controlled by the interaction of the top portion 26 with the cover 28. More specifically, as shown in FIG. 2, the ink 22 is held in the tubular member 20 by means of an interference fit at a surface 36. In a position shown in FIG. 2, a central region 38 of the top portion 26 is in contact with the ink 20 with a radially outwardly located ridge 40 extending outwardly away from the ink 22. As shown in FIG. 3, relative movement of the cover 28 with respect to the tubular member 20 actually crushes the ridge 40 so as to force the central portion 38 downwardly, thereby pushing the ink 22 away from the surface 36 so as to release the ink.

As shown in FIGS. 2 and 3, the cartridge is inserted into a cylindrical reservoir 42 having an opening 44 in a base 46. In accordance with this invention, it is the engagement and cooperation between the cartridge of ink and the reservoir of receiving means 42 which permits the ink to be released into the reservoir 42.

The engagement and cooperation between the cartridge and the reservoir involves the use of three radially extending pins 48 which protrude from the reservoir to a position so as to cooperate with a cam surface 50 and the cover 28. More specifically, the cam surface 50 rises in a manner so as to force the cover 28 downwardly toward the base 46 of the reservoir 42 as the cover 28 is rotated with the pins 48 in contact with the cam surface 50 such that the ridge 40 moves from the uncollapsed position shown in FIG. 2 to the collapsed position shown in FIG. 3 due to the engagement of an annular surface 52 with the ridge 40. In order to permit the cartridge to be inserted into the reservoir 42, slotted openings 54 are provided at one end of each of the cam surfaces 50 so that the pins 48 will slip through the cover up to the cam surface 50.

In accordance with another important aspect of the invention, a seal is made between the cartridge and the reservoir. In this connection, top portion 26 of the cartridge includes an annular sealing flange 56 which extends outwardly from the tubular member 20 so as to rest on the top of the reservoir 42. This assures that the loading of the cartridge into the reservoir 42 will provide a seal for the reservoir so as to permit priming of the apparatus. The flange 56 includes ears 58 which extend outwardly so as to rest on the surface 60 within the cover 28. The ears 58 are sufficiently small so as to slip through the slots 54 to permit assembly of the cover 28 to the tubular member 20.

In accordance with another important aspect of the invention, the cover 28 comprises an insulating material (e.g., plastic) so as to permit an operator to manipulate the cover and the cartridge and release the ink without risking a burn. The remainder of the cartridge may also comprise the same insulating material.

It will, therefore, be appreciated that solid ink may be stored in the cartridge shown in FIGS. 1 through 3 during shipping and handling without risk of contamination, even if the container is dropped. Moreover, the cartridge is sufficiently simple so as to be disposable once the cartridge is removed and replaced by another cartridge with a fresh supply of ink. Furthermore, the cartridge by nature permits sealing of the reservoir which, in turn, permits priming and assures that no contaminant will enter the reservoir. It will also be appreciated that the solid ink or pellet 22 has a volume which substantially fills the receiving means 42. Preferably, this volume exceeds 33% of the receiving means volume with 50% being more preferred. In this connection, the diameter of the pellet 22 should exceed 50% of the diameter of the receiving means 42.

In the embodiment shown in FIGS. 1 through 3, the ink is retained within the cartridge by an interference fit with the upper end of the ink. The ink is then released upon rotation of the cartridge tap which in turn forces the ink downwardly free of the gripping surface 36. In the embodiment which will now be described with respect to FIGS. 4 through 5, the ink is retained by support at the lower end.

Figure 4:
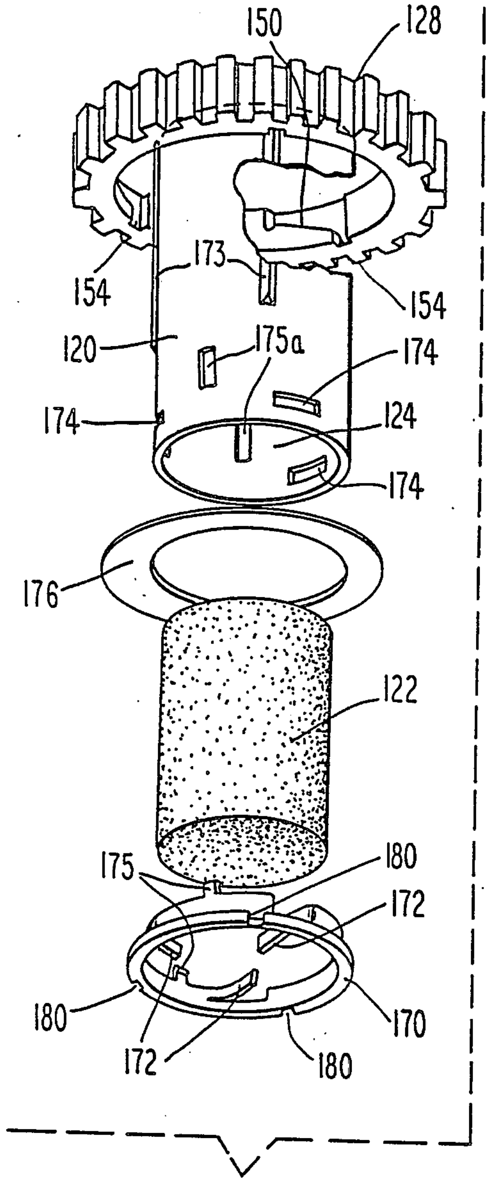
FIG. 4 is an exploded view of the cartridge representing another embodiment of the invention.
Figure 8:
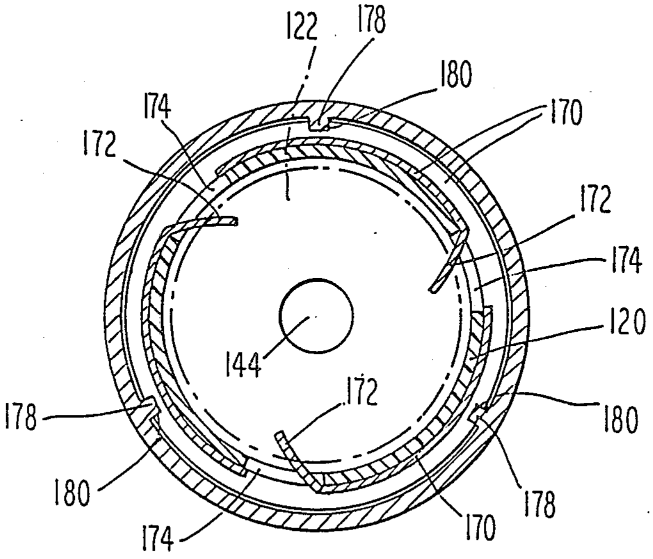
FIG. 8 is a sectional view taken along line 8—8 of FIG. 6.
Figure 9:
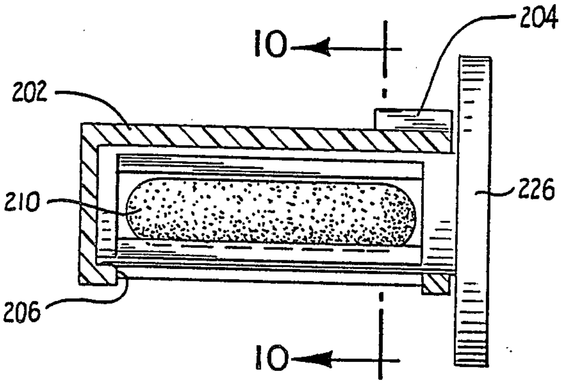
FIG. 9 is a sectional view of an ink cartridge of yet another embodiment of the invention.
Figure 10:
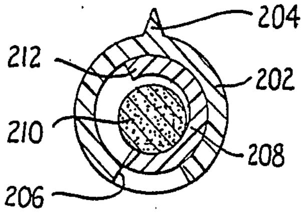
FIG. 10 is a sectional view taken along line 10—10 of FIG. 9.

Referring to FIG. 4, the exploded cartridge is similar to that shown in FIG. 1, including the tubular member 120 for receiving the solid ink 122 within a cylindrical cavity 124. Similarly, the cartridge includes a rotatable cover 128 which cooperates with the reservoir 142, shown in FIG. 5, in a manner so as to release the solid ink 122 from the cartridge. In this connection, the cover 128 includes a cam surface 150, as well as a slot 154 leading to the cam surface 150. In the embodiment of FIG. 4, however, a retaining ring 170, including flexible, radially inwardly extending fingers 172 is provided. When the cartridge is assembled, the fingers 172 extend radially inwardly through the circumferentially spaced slots 174 on the tubular member 120, as shown in FIG. 8, so as to support the ink 122 within the tubular member 120. In order to retain the ring 170 on the cartridge, retention fingers 175 are provided which are adapted to be received by slots 175*a*. Fins 173 center the cartridge upon insertion into a reservoir.

Figure 6:
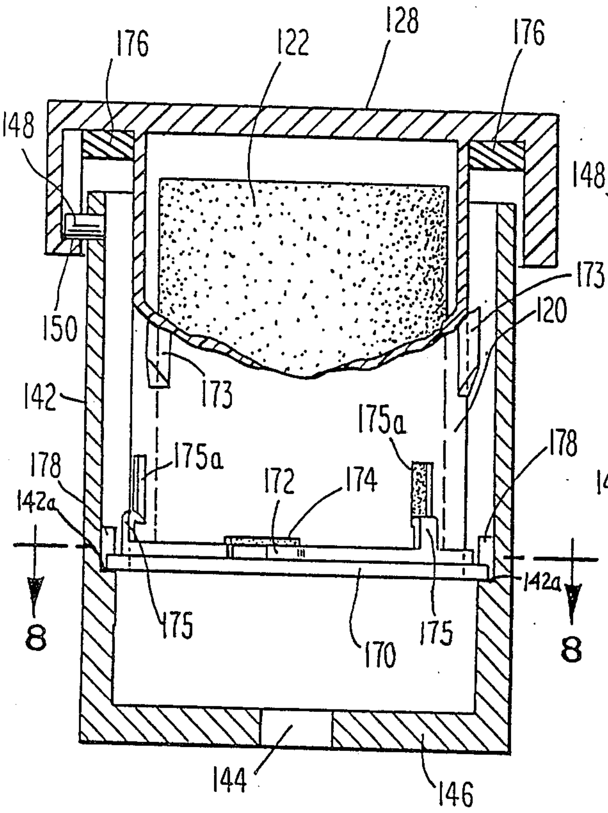
FIG. 6 is a sectional view of the cartridge of FIG. 4 and the reservoir of FIG. 5 prior to release of the ink.

As also shown in FIG. 4, a sealing ring 176 is provided which is retained on the underside of the cover 128 as shown in FIG. 6. The sealing ring 176 is adapted to cooperate with the reservoir 142 so as to provide a seal when the cartridge is in place to permit priming and to prevent contamination.

Figure 5:
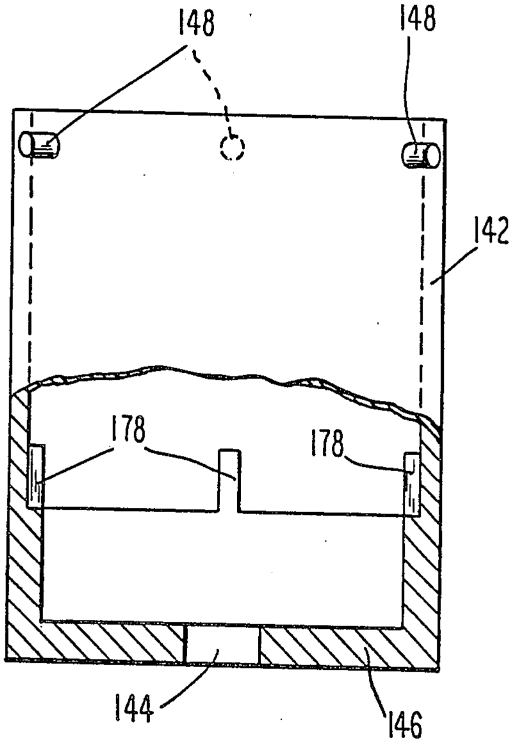
FIG. 5 is a sectional view of the reservoir which may be utilized with the cartridge of FIG. 4.

Reference will now be made to FIG. 5 wherein the reservoir 142 is disclosed. As shown, the reservoir 142 is substantially identical to the reservoir 42 described in FIGS. 2 and 3, except for the addition of keying projections 178. Keying projections 178 are adapted to be keyed with slots 180 and the ring 170 so as to permit rotation of the ring 170 relative to the cartridge as the cartridge rotates during release of the ink pellet. Pins 148 are provided in the reservoir 142, as well as an opening 144 in the base 146.

Figure 7:
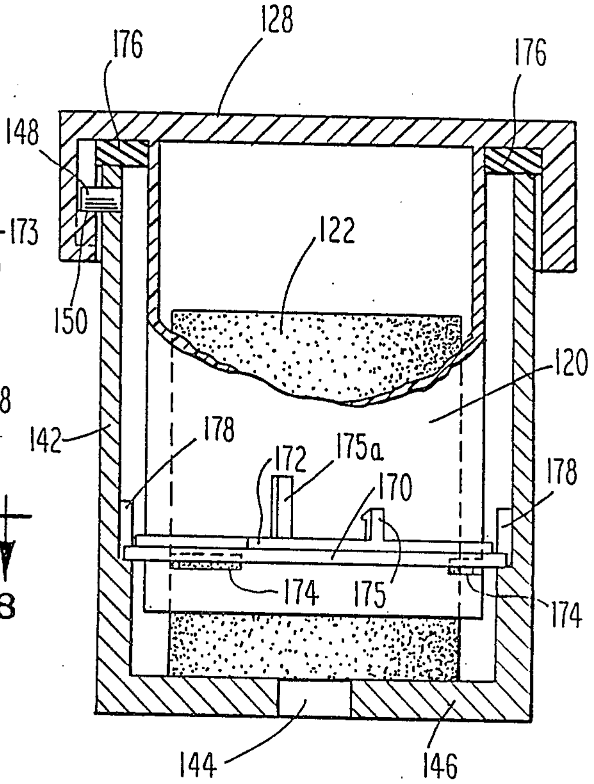
FIG. 7 is a sectional view of the cartridge of FIG. 4 and the reservoir of FIG. 7 after release of the ink.

In accordance with one important aspect of the invention, the cartridge including the cover 128 which is gripped by the operator comprises an insulating material. This allows the operator to release the ink without hazard to the operator. Reference will now be made to FIGS. 6 through 8 for an understanding of the retention and release of the ink 122 in and from the cartridge. As shown in FIG. 6, the pins 148 in the reservoir 142 cooperate with the cam surface 150 at one extremity of that surface while the keying projections 178 pass into the slots 180 of the retaining ring 170. At this position, the flexible fingers 172 are inserted into the slots 174 so as to support the ink 122 within the reservoir 142 a spaced distance above the bottom 146. In this position, the fingers 172 are in the position shown in FIG. 8. Also note that retention fingers 175 are received by slots 175*a*, and that the retaining ring 170 initially rests upon a shoulder portion 142 of the reservoir 142.

Referring to FIG. 7, the cover 128 is rotated so as to move the cover downwardly while the pins 148 slide along the cam surface 150. As rotation continues, the cover 128 ultimately reaches the position shown in FIG. 7 with the sealing ring 176 in contact with the upper surface of the reservoir 142. In this position, the ring 170 which was prevented from rotation by the keying projections 178 remains stationary against the shoulder portion 142*a* while the tubular member 120 rotates to a position such that the retention fingers 175 have been forced radially outward from the slots 170*a*. The tubular member 120 continues to rotate and travels downward through the retaining ring 170 such that the slots are no longer aligned with the fingers 172. As a consequence, the cartridge can be rotated back to the position shown in FIG. 6 without the fingers 172 extending through the slots 174 since the slots and the fingers are now in a different plane along the axis of the tubular member 120.

It will be appreciated that cartridges disclosed in the subject application may be utilized in a variety of ink jet apparatuses wherein droplets of phase change or hot melt ink are ejected from orifices in ink jet chambers. See, for example, co-pending application Ser. No. 660,656, filed Oct. 15, 1984, and Ser. No. 660,657, filed Oct. 15, 1984, both of which are incorporated herein by reference. In addition, it will be appreciated that various hot melt or phase change inks may be utilized such as those disclosed in co-pending application Ser. No. 610,627, filed May 16, 1984, which is also incorporated herein by reference.

Figure 11:
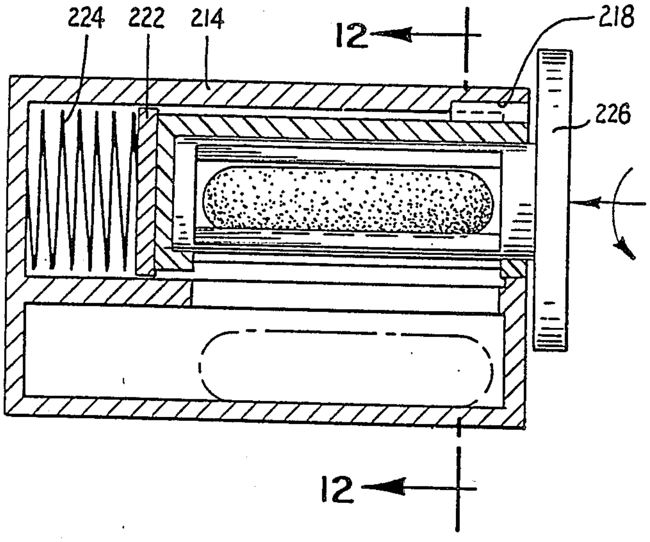
FIG. 11 is a sectional view of the cartridge of FIG. 9 and an appropriate reservoir prior to the release of the ink.
Figure 12:
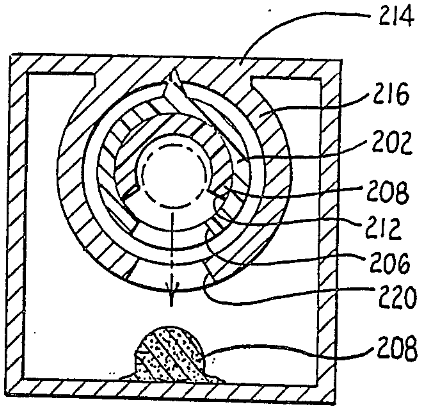
FIG. 12 is a sectional view taken along line 12—12 of FIG. 11 after release of the ink.

Alternative embodiments of the invention as shown in FIGS. 9 through 14. For example, the cartridge illustrated in FIGS. 9 through 12 includes an outer cylinder 202 having a key portion 204 and a slot 206 formed therein, and an inner cylinder 208 rotatably coupled within the outer cylinder 208, thereby aligning the slot 206 within the outer cylinder 202 with a corresponding slot 212 formed within the inner cylinder 208, both of which are adapted to permit passage of the pellet 210 therethrough. Referring now to FIGS. 11 and 12, the cartridge is loaded within a receiving means 214 including a tubular member 216 having a keyway 218 and a slot 220 formed therein. A plug 222 adapted to seal the end of the tubular member 216 which receives the cartridge is attached to a spring 224 such that it is pushed out of the way upon loading of the cartridge within the receiving means 214. A grip 226 attached to one end of the inner cylinder 208 is then rotated, thus aligning slots 206, 212 and 220 each with the other permitting the pellet 210 to drop within a reservoir portion 288 of the receiving means 214. The cartridge is then withdrawn, allowing the plug 222 to reseal the receiving means 214.

Figure 13:
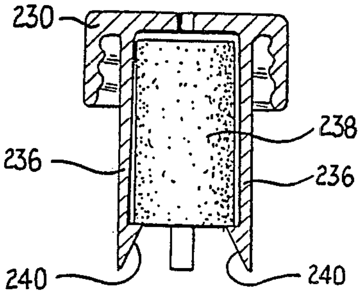
FIG. 13 is a sectional view of an ink cartridge of still another embodiment of the invention.
Figure 14:
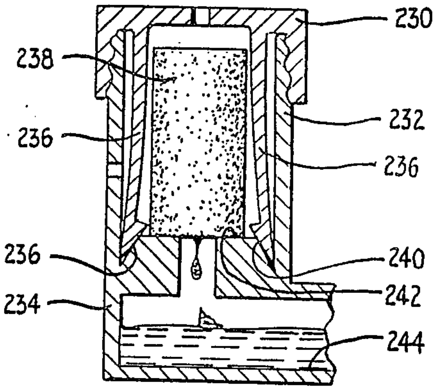
FIG. 14 is a sectional view of the cartridge of FIG. 13 uilized in an appropriate reservoir.

Referring to FIGS. 13 and 14, another embodiment is shown. The cartridge illustrated may be formed of an insulating material (e.g., plastic) having a female-threaded grip portion 230 which is formed to mate with a male-threaded portion 232 of a receiving means 234. A plurality of fingers 236 are formed to hold pellet of hot melt ink 238 upon a barb 240 at the end of each finger 236. When the cartridge is screwed down upon the receiving means 234, the fingers 236 are displaced outwardly by a slanted shelt portion 242 of the receiving means, thus permitting the pellet 238 to come in contact with a metal reservoir 244 which can be conventionally heated to melt the ink.

Although particular embodiments of the invention have been shown and described, various modifications will occur to those of ordinary skill in the art and such modifications are intended to fall within the true spirit and scope of the invention as set forth in the appended claims.

What is claimed is:

1. An ink jet apparatus comprising:
   at lease one ink jet, including a chamber, and a droplet ejecting orifice;
   a cartridge for retaining solid ink; and
   receiving means for receiving solid ink from said cartridge, said receiving means being adapted to engage and cooperate with said cartridge for releasing said solid ink upon engagement and cooperation with said receiving means.

2. The apparatus of claim 1 wherein said cartridge releases said solid ink upon engagement and cooperation including relative movement between said receiving means and said cartridge.

3. The apparatus of claim 2 wherein said cartridge releases said solid ink upon engagement and cooperation including rotation of said cartridge.

4. The apparatus of claim 3 wherein said cartridge and said receiving means include keying means so as to provide keyed engagement and cooperation between said cartridge means and said receiving means.

5. The apparatus of claim 1 wherein said cartridge and said receiving means include keying means for keyed engagement with cooperation between said cartridge and said receiving means.

6. An ink jet apparatus comprising:
   at least one ink jet, including a chamber, and a droplet ejecting orifice;
   a cartridge for retaining solid ink; and
   receiving means for receiving solid ink from said cartridge, said receiving means being adapted to engage and cooperate with said cartridge for releasing said solid ink upon engagement and cooperation with said receiving means;
   wherein said cartridge includes an opening through which said solid ink falls under the influence of gravity, said cartridge further including means interfering with the falling of said solid ink prior to cooperation and engagement between said cartridge means and said receiving means.

7. The apparatus of claim 6 wherein said means for interfering is adapted to retract from a position of interference with the ink when the ink is released upon engagement and cooperation between said cartridge means and said receiving means 8. The apparatus of claim 7 wherein said means for interfering supports one end of said ink.

9. The apparatus of claim 8 wherein said means for interfering retracts upon rotation of said cartridge relative to said receiving means.

10. The apparatus of claim 7 wherein said means for interfering comprises a ring including radially extending fingers, said Fingers being retracted upon rotation.

11. The apparatus of claim 10 including means for retaining said ring on the cartridge.

12. The apparatus of claim 6 wherein said means for interfering includes gripping means for gripping the solid ink.

13. The apparatus of claim 12 wherein said cartridge includes actuator means for driving ink to a position free of said gripping means.

14. The apparatus of claim 13 wherein said actuator means drives said ink to a position free of said gripping means upon relative rotation between said cartridge means and said receiving means.

15. The apparatus of claim 1 wherein said cartridge includes sealing means for forming a seal with said receiving means.

16. The apparatus of claim 1 wherein said cartridge means comprises a tubular member, a cover at one end of said tubular member and an opening at the other end of said tubular member.

17. The apparatus of claim 1 wherein said cartridge means and said receiving means include keying means for keying said cartridge to said receiving means before releasing said solid ink.

18. The apparatus of claim 1 wherein said cartridge comprises insulating means for thermally insulating an operator from the reservoir.

19. A method of loading a hot melt ink jet apparatus comprising at least one ink jet, a cartridge for containing solid ink at room temperature, a reservoir for containing and melting solid ink, a receiving means providing an inlet for solid ink to said reservoir, said method comprising the following steps retaining the solid ink in the cartridge;

moving the cartridge to a position of engagement with said receiving means;

creating relative movement between said cartridge and said receiving means after engagement;

releasing the solid ink from the cartridge in response to engagement and relative movement; and dropping the ink under the influence of gravity after releasing the ink from the cartridge.

20. The method of claim 19 wherein the step of retaining includes supporting said solid ink.

21. The method of claim 19 wherein the step of retaining includes gripping the solid ink.

22. The method of claim 19 wherein the step of creating relative movement comprises rotating of the cartridge relative to the reservoir.

23. The method of claim 19 wherein step of moving the cartridge to a position of engagement includes keying said cartridge to said receiving means.

24. The method of claim 19 including the step of forming a seal between the cartridge and the receiving means.

25. A method of operating a hot melt ink jet apparatus comprising at least one ink jet, a cartridge adapted to contain solid ink at room temperature, a reservoir for containing and melting solid ink, and a receiving means providing an inlet for solid ink to said reservoir, said method comprising the following steps:

moving said cartridge to a position of engagement with said receiving means;

creating relative movement between said cartridge and said receiving means after engagement; and forming a seal between said cartridge and said receiving means.

26. The method of claim 25 including the step of retaining the solid ink in the cartridge.

27. The method of claim 25 including the step of releasing the solid ink from the cartridge in response to engagement and relative movement.

28. A hot melt ink pellet in combination with a hot melt ink jet apparatus comprising at least one ink jet, a reservoir for containing and melting hot melt ink in the solid state, and a substantially cylindrical receiving means adapted to receive a cartridge capable of containing solid ink, said receiving means having an outlet at the base thereof for flowing ink into the reservoir, and said pellet being of a size and shape so as to substantially fill said receiving means.

29. The hot melt ink pellet of claim 28 wherein the volume of the pellet exceeds 33% of the volume of said receiving means.

30. The hot melt ink pellet of claim 28 wherein the volume of the pellet exceeds 50% of the volume of said receiving means.

31. The hot melt ink pellet of claim 28 wherein said pellet is substantially cylindrical in shape.

32. The hot melt ink pellet of claim 28 wherein the diameter of said pellet exceeds 50% of the diameter of said receiving means.

33. The hot melt ink pellet of claim 28 also in combination with said cartridge.

* * * * *

UNITED STATES PATENT AND TRADEMARK OFFICE

CERTIFICATE OF CORRECTION

PATENT NO. : 4,739,339

DATED : April 19, 1988

INVENTOR(S) : Thomas W. DeYoung et al

It is certified that error appears in the above-identified patent and that said Letters Patent is hereby corrected as shown below:

Col. 1, line 36, "holt" should be --hot--.

Col. 6, line 9, "lease" should be --least--.

Signed and Sealed this

First Day of November, 1988

*Attest:*

DONALD J. QUIGG

*Attesting Officer*

*Commissioner of Patents and Trademarks*